United States Patent
Jia et al.

(10) Patent No.: US 8,755,388 B2
(45) Date of Patent: Jun. 17, 2014

(54) SYSTEM AND METHOD FOR ACKNOWLEDGEMENT PACKET TRANSMITTING AND RECEIVING

(75) Inventors: Zhanfeng Jia, Belmont, CA (US); Qingjiang Tian, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 12/247,935

(22) Filed: Oct. 8, 2008

(65) Prior Publication Data

US 2010/0074366 A1    Mar. 25, 2010

Related U.S. Application Data

(60) Provisional application No. 61/098,606, filed on Sep. 19, 2008.

(51) Int. Cl.
*H04L 12/28* (2006.01)

(52) U.S. Cl.
USPC .......................................... 370/394; 370/231

(58) Field of Classification Search
None
See application file for complete search history.

(56) References Cited

U.S. PATENT DOCUMENTS

| | | | |
|---|---|---|---|
| 6,073,266 A | 6/2000 | Ahmed et al. | |
| 6,275,488 B1 * | 8/2001 | Cudak et al. | 370/347 |
| 6,697,987 B2 * | 2/2004 | Lee et al. | 714/751 |
| 7,065,068 B2 * | 6/2006 | Ghosh et al. | 370/342 |
| 7,339,949 B2 | 3/2008 | Suzuki et al. | |
| 7,631,239 B2 | 12/2009 | Yeo et al. | |
| 7,733,843 B1 | 6/2010 | Vogl et al. | |
| 8,306,032 B2 * | 11/2012 | Jia et al. | 370/394 |
| 2006/0107166 A1 | 5/2006 | Nanda | |
| 2007/0097987 A1 | 5/2007 | Rey et al. | |
| 2008/0137605 A1 | 6/2008 | Berg | |
| 2010/0074366 A1 * | 3/2010 | Jia et al. | 375/295 |
| 2010/0165869 A1 * | 7/2010 | Jia et al. | 370/252 |

FOREIGN PATENT DOCUMENTS

| | | |
|---|---|---|
| CN | 1260929 A | 7/2000 |
| CN | 1379557 A | 11/2002 |
| CN | 1402463 A | 3/2003 |
| JP | 2003179581 A | 6/2003 |

(Continued)

OTHER PUBLICATIONS

International Search Report—PCT/US09/032262, International Search Authority—European Patent Office—Mar. 24, 2009.

(Continued)

*Primary Examiner* — Robert Wilson
(74) *Attorney, Agent, or Firm* — Paul S. Holdaway

(57) ABSTRACT

A communications method comprising the steps of receiving a data packet; processing the data packet; and transmitting an ack packet approximately at an end of a first defined time interval if the processing of the data packet is completed within the first defined interval, or transmitting the ack packet approximately at an end of a second defined time interval if the processing of the data packet is not completed within the first defined interval and is completed within the second defined interval. Another communication method comprising the steps of transmitting a data packet; scanning a channel for an ack packet approximately at an end of a first defined time interval from the transmission of the data packet; and scanning the channel for the ack packet approximately at an end of a second defined time interval from the transmission of the data packet if the ack packet was not received within the first defined interval.

22 Claims, 6 Drawing Sheets

(56) References Cited

FOREIGN PATENT DOCUMENTS

| | | |
|---|---|---|
| JP | 2006086551 A | 3/2006 |
| JP | 2007502558 A | 2/2007 |
| JP | 2008099171 A | 4/2008 |
| WO | WO-2008028006 A2 | 3/2008 |

OTHER PUBLICATIONS

Written Opinion—PCTT/US09/032262, International Search Authority—European Patent Office—Mar. 24, 2009.

Taiwan Search Report—TW098103309—TIPO—Sep. 12, 2013.

* cited by examiner

SYSTEM AND METHOD FOR ACKNOWLEDGEMENT PACKET TRANSMITTING AND RECEIVING

CLAIM PRIORITY UNDER 35 U.S.C. §119

The present Application for Patent claims priority to Provisional Application No. 61/098,606 entitled "SYSTEM AND METHOD FOR ACKNOWLEDGEMENT PACKET TRANSMITTING AND RECEIVING" filed Sep. 19, 2008, and assigned to the assignee hereof and hereby expressly incorporated by reference herein.

FIELD

The present disclosure relates generally to communications systems, and more specifically, to a system and method for acknowledgment packet transmitting and receiving.

BACKGROUND

In many communications systems, the transmission of a data packet from a source node to a destination mode may require an acknowledgement packet ("ack packet") to be sent by the destination node to the source node to provide the latter notification of the successful receipt and validation of the data packet. In this way, the source node receives feedback regarding the transmission of the data packet. The requirement of responsive ack packets may be needed in some communications system in order to implement a packet retransmission scheme in order to meet a quality of service (QoS) requirement of upper layer applications.

In prior communications systems, after a source node transmits the data packet, the source node scans the channel only once for the ack packet from the destination node. If it does not receive the ack packet, the source node will then schedule a retransmission of the data packet to the destination node or mark the data packet as a failed transmission, depending on if the number of maximal allowed retransmissions has been met or not. In such systems, the retransmission rate or the number of failed transmissions may be very high depending on the channel conditions, which would most likely adverse affect the QoS of the communications session between the source and destination nodes.

SUMMARY

An aspect of the disclosure relates to a communication method comprising receiving a first packet; processing the first packet; and transmitting a second packet approximately at an end of a first defined time interval if the processing of the first packet is completed within the first defined interval, or transmitting the second packet approximately at an end of a second defined time interval if the processing of the first packet is not completed within the first defined interval and is completed within the second defined interval. In another aspect, the first defined interval may be based on at least one of a first estimated duration for receiving the first packet or a second estimated duration for processing the first packet. In yet another aspect, the first packet comprises at least one of a preamble or a payload. In still another aspect, the second packet comprises at least one of a preamble or a message indicating at least one of receiving the first packet, processing the first packet, or validating the first packet.

In another aspect, the difference between the first defined interval and the second defined interval may be based on simultaneous communications links being supported. In yet another aspect, a receiver is enabled at approximately a beginning of a packet receive cycle in order to receive the first packet, and disabled after the receiver completes receiving the first packet in order to conserve power. In still another aspect, a transmitter may be enabled at approximately the end of the first or second defined time interval in order to transmit the second packet, and then disabled after the transmitter completes transmitting the second packet in order to conserve power.

Another aspect of the disclosure relates to another communication method comprising transmitting a first packet; scanning a channel for a second packet approximately at an end of a first defined interval from the transmission of the first packet; and scanning the channel for the second packet approximately at an end of a second defined time interval from the transmission of the first packet if the second packet was not received within the first defined interval. In another aspect, the first defined interval may be based on an estimated duration for receiving the second packet in response to transmitting the first packet. In yet another aspect, the first packet may comprise at least one of a preamble or a payload. In still another aspect, the difference between the first defined interval and the second defined interval may be based on simultaneous communications links being supported.

In another aspect, a transmitter may be enabled at approximately a beginning of a packet transmit cycle in order to transmit the first packet, and disabled after the transmitter completes transmitting the first packet in order to conserve power. In yet another aspect, a receiver may be enabled at approximately the end of the first or second defined time interval in order to scan for the second packet, and then disabled after the receiver completes performing the first scan, second scan, or receiving the second packet in order to conserve power. In still another aspect, the receiving and/or transmitting elements described herein may be configured to receive a signal having a fractional spectrum on the order of 20% or more, a spectrum on the order of 500 MHz or more, or a fractional spectrum on the order of 20% or more and a spectrum on the order of 500 MHz or more. The use of the phrase at least one of "a", "b", or "c" as used herein shall mean "a", or "b", or "c", or any combination thereof.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As an example of some of the above concepts, in some aspects, the disclosure relates to a communication method comprising the steps of receiving a data packet; processing the data packet; and transmitting an ack packet approximately at an end of a first defined interval if the processing of the data packet is completed within the first defined interval, or transmitting the ack packet approximately at an end of a second defined time interval if the processing of the data packet is not completed within the first defined interval, but is completed within the second defined time interval. Another communication method entails transmitting a data packet; scanning a channel for an ack packet approximately at an end of a first defined interval from the transmission of the data packet; and scanning the channel for the ack packet approximately at an end of a second defined time interval from the transmission of the data packet if the ack packet was not received within the first defined interval.

Figure 1:
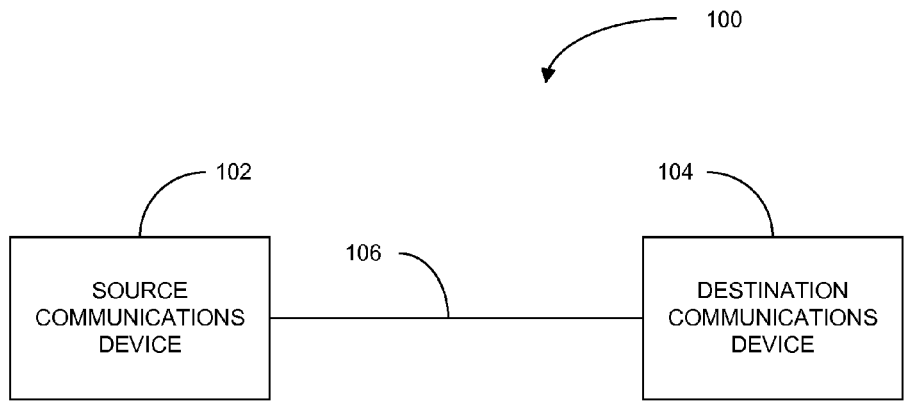
FIG. 1 illustrates a block diagram of an exemplary communications system in accordance with an aspect of the disclosure.

FIG. 1 illustrates a block diagram of an exemplary communications system 100 in accordance with an aspect of the disclosure. The communications system 100 comprises a source communications device 102, and a destination communications device 104 communicatively coupled to the source communications device 102 via a communications medium 106. The communications devices 102 and 104 each may be any device that are able to send packets to each other by way of the communications medium 106. In this example, the communications device 102 is the "source" because it is initiating the sending of a data (or control) packet to the destination communications device 102. The communications device 104 is the "destination" because it receives the data packet from the source communications device 102, and sends a response packet back to the source communications device 102 based on one or more defined conditions. The communications medium 106 may be any medium through which packets may be communicated between the source and destination devices, such as a wired medium, wireless medium, or combination thereof.

As discussed in more detail below, the source communications device 102 transmits a packet to the destination communications device 104, and schedules two possible non-overlapping scans S1 and S2 for receiving a response packet from the destination communications device 104. The first scan S1 is scheduled at approximately at an end of a first defined time interval T1 from the transmission of the packet, and the second scan S2 is scheduled approximately at an end of a second defined time interval T2 after the transmission of the packet. The second defined interval T2 has a length greater than the first time interval T1 (e.g., T2>T1).

If the source communications device 102 receives the response packet during the first scan S1, the source communications device 102 may not perform the second scan S2. However, if the source communications device 102 does not receive the response packet during the first scan S1, the source communications device 102 performs the second scan S2. If the source communications device 102 does neither receive the response packet during both the first and second scans S1 and S2, the source communications device 102 may schedule a retransmission of the packet or mark the packet as a failed transmission.

The destination communications device 104, in turn, receives the packet from the source communications device 102, and processes the packet in order to validate it. If the destination communications device 104 completes processing and validating the packet within the first time interval T1, the destination communications device 104 transmits the response packet to the source communications device 102 at approximately the end of the first time interval T1. If, on the other hand, the destination communications device 104 does not complete the processing and validating of the packet within the first time interval T1, but completes the processing and validating of the packet within the second time interval T2, the destination communications device 104 transmits the response packet to the source communications device 102 at approximately the end of the second time interval T2. If the destination communications device 102 fails to process and validate the received packet within the second time interval T2, the destination communications device 104 may not send a response packet to the source communications device 102. These concepts are described in more detail below.

Figure 2:
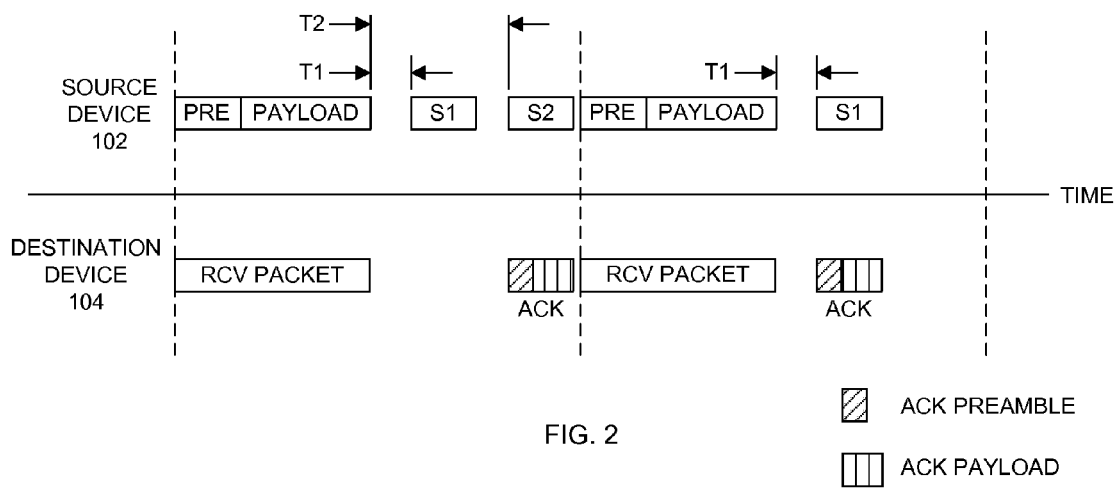
FIG. 2 illustrates a timing diagram of an exemplary method of acknowledgement packet transmitting and receiving in accordance with another aspect of the disclosure.

FIG. 2 illustrates a timing diagram of an exemplary method of acknowledgement packet transmitting and receiving in accordance with another aspect of the disclosure. As illustrated in the timing diagram, the transmission of the data packet and the possible response packet may be accomplished within a packet transmitting (or receiving) cycle, delineated in the diagram by vertical dashed lines. Although two (2) defined packet transmitting cycles are illustrated in the timing diagram, there may be many others in an actual communication session between the source and destination devices. The upper half of the timing diagram illustrates the operations of the source communications device 102, and the lower half of the diagram illustrates the operations of the destination communications device 104. In this example, the first (left) packet transmitting cycle is used to illustrate the situation where the destination communications device 104 transmits the response packet (e.g., an ack packet) to the source communications device 102 during the second scan S2 performed by the source communications device 102. The second (right) packet transmitting cycle is used to illustrate the situation where the destination communications device 104 transmits the response packet to the source communications device 102 during the first scan S1 performed by the source communications device 102.

As the timing diagram illustrates, in the first packet transmitting cycle, the source communications device 102 begins by transmitting a packet to the destination communications device 104. As exemplified, the packet may comprise a preamble and a payload. After a transmission propagation delay, the destination communications device 104 receives the packet from the source communications device 102. Once it receives the packet, the destination communications device 104 begins processing the packet in order to validate it. At approximately an end of a defined time interval T1 from the transmission of the packet, the source communications device 102 performs a first scan S1 of the channel to attempt to receive a response packet from the destination communications device 104. In this example, the destination communications device 104 has not completed the processing and validating of the packet within the first time interval T1. Accordingly, the destination communications device 104 does not send a response packet during the first scan S1 performed by the source communications device 102.

In response to not receiving the response packet during the first scan S1, the source communications device 102 performs a second scan S2 of the channel to attempt to receive a response packet from the destination communications device 104. In this example, the destination communications device 104 has completed the processing and validating of the packet within the second time interval T2. Accordingly, the destination communications device 104 sends a response packet during the second scan S2 performed by the source communications device 102. In this case, the source communications device 102 receives the response packet. The response packet may be an ack packet which may also include a preamble and a payload containing data. The data may indicate that the packet from the source communications device 102 was received, processed and/or validated.

At approximately the beginning of the second packet transmitting cycle, the source communications device 102 sends another packet to the destination communications device 104. After a transmission propagation delay, the destination communications device 104 receives the packet from the source communications device 102. Once it receives the packet, the destination communications device 104 begins processing the packet in order to validate it. At approximately an end of a defined time interval T1 after the transmission of the packet, the source communications device 102 performs a first scan S1 of the channel to attempt to receive a response packet from the destination communications device 104. In this example, the destination communications device 104 has completed the processing and validating of the packet within the first time interval T1. Accordingly, the destination communications device 104 sends a response packet during the first scan S1, which is received by the source communications device 102.

The first defined time interval T1 may be based on an estimated minimum time for the source destination device to receive the response packet in response to the transmission of the data packet. The second defined time interval T2 may be based on an estimated maximum time for the source destination device to receive the response packet in response to the transmission of the data packet. For instance, the first defined time interval T1 may be such an estimate when one communications link is supported. Whereas, the second defined time interval may be such an estimate when a maximum number of simultaneous links are being supported. These time intervals T1 and T2 may be based on the two-way propagation delay between the devices, and the delay associated with the receiving and processing of the data packet by the destination communications device.

Figure 3:
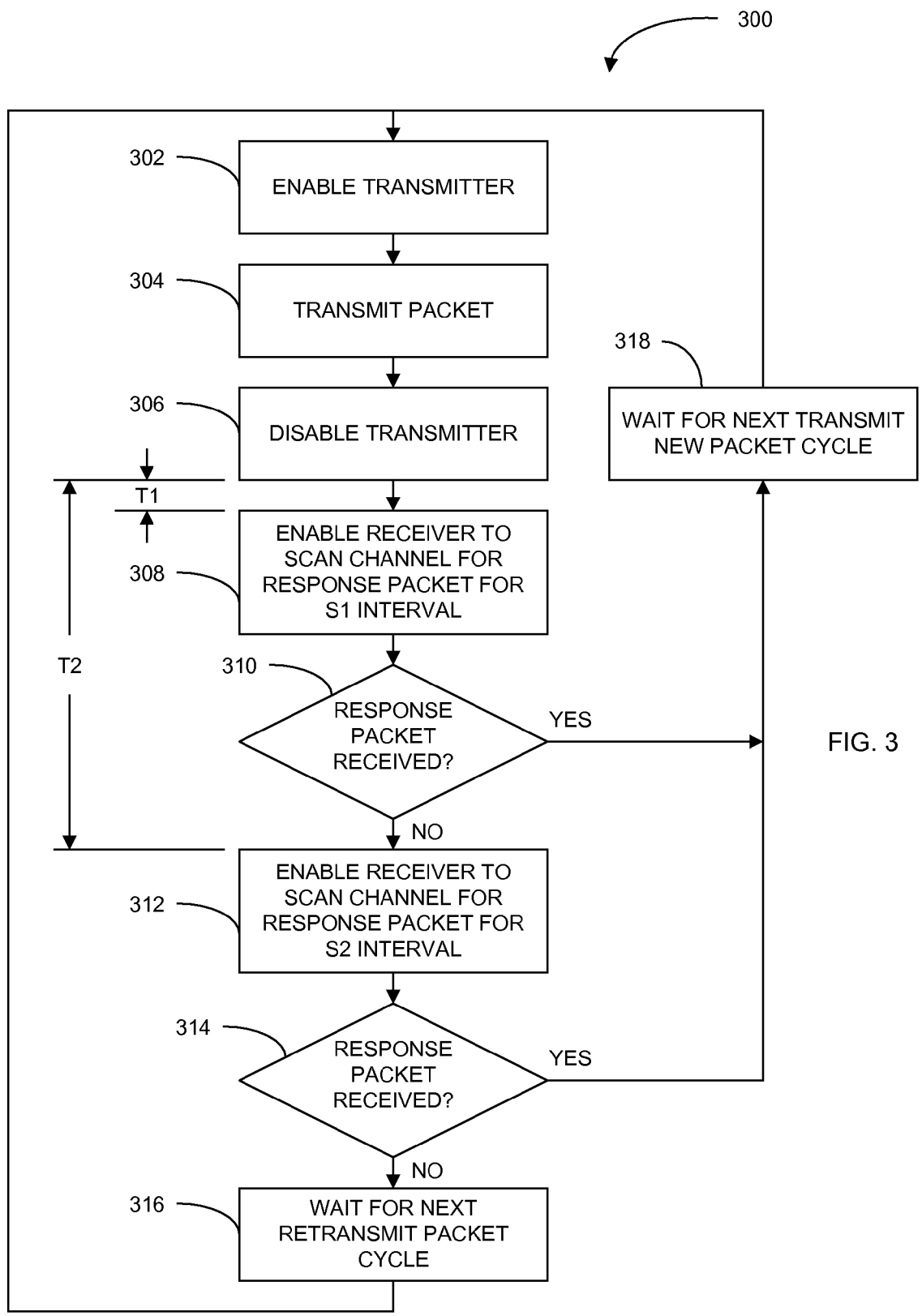
FIG. 3 illustrates a flow diagram of an exemplary method of transmitting a packet and receiving a response packet in accordance with another aspect of the disclosure.

FIG. 3 illustrates a flow diagram of an exemplary method 300 of transmitting a packet and receiving a response packet performed by the source communications device 102 in accordance with another aspect of the disclosure. According to the method 300, at approximately the beginning of a packet transmitting cycle, the source communications device 102 enables its transmitter 302 for the purpose of transmitting the data packet to the destination communications device 104 (block 302). After the transmitter is enabled, the source communications device 102 transmits the packet to the destination communications device (block 304). After transmitting the packet, the source communications device 102 disables the transmitter in order to better conserve power (block 306). At such time, the source communication device 102 initiates a timer to mark the beginning of the first and second defined time intervals T1 and T2.

At approximately the end of the first defined time interval T1, the source communications device 102 enables its receiver to perform a first scan S1 of the channel for a response packet from the destination communications device 104 (block 308). The source communications device 102 then determines whether the response packet was received (block 310). If, in block 310, it has determined that the response packet was received, the source communications device 102 waits for the next transmit new packet cycle (block 318). If, on the other hand, in block 310, it determines that it has not received the response packet, the source communications device 102, at approximately the end of the second defined time interval, enables its receiver to perform a second scan S2 of the channel for a response packet from the destination communications device 104 (block 312).

The source communications device 102 then determines again whether the response packet was received (block 314). If, in block 314, it has determined that the response packet was received, the source communications device 102 waits for the next transmit new packet cycle (block 318). If, on the other hand, in block 314, it determines that it has not received the response packet, the source communications device 102 may wait for the next packet transmitting cycle to retransmit the packet (block 316), or may simply mark the packet as a failed transmission.

Figure 4:
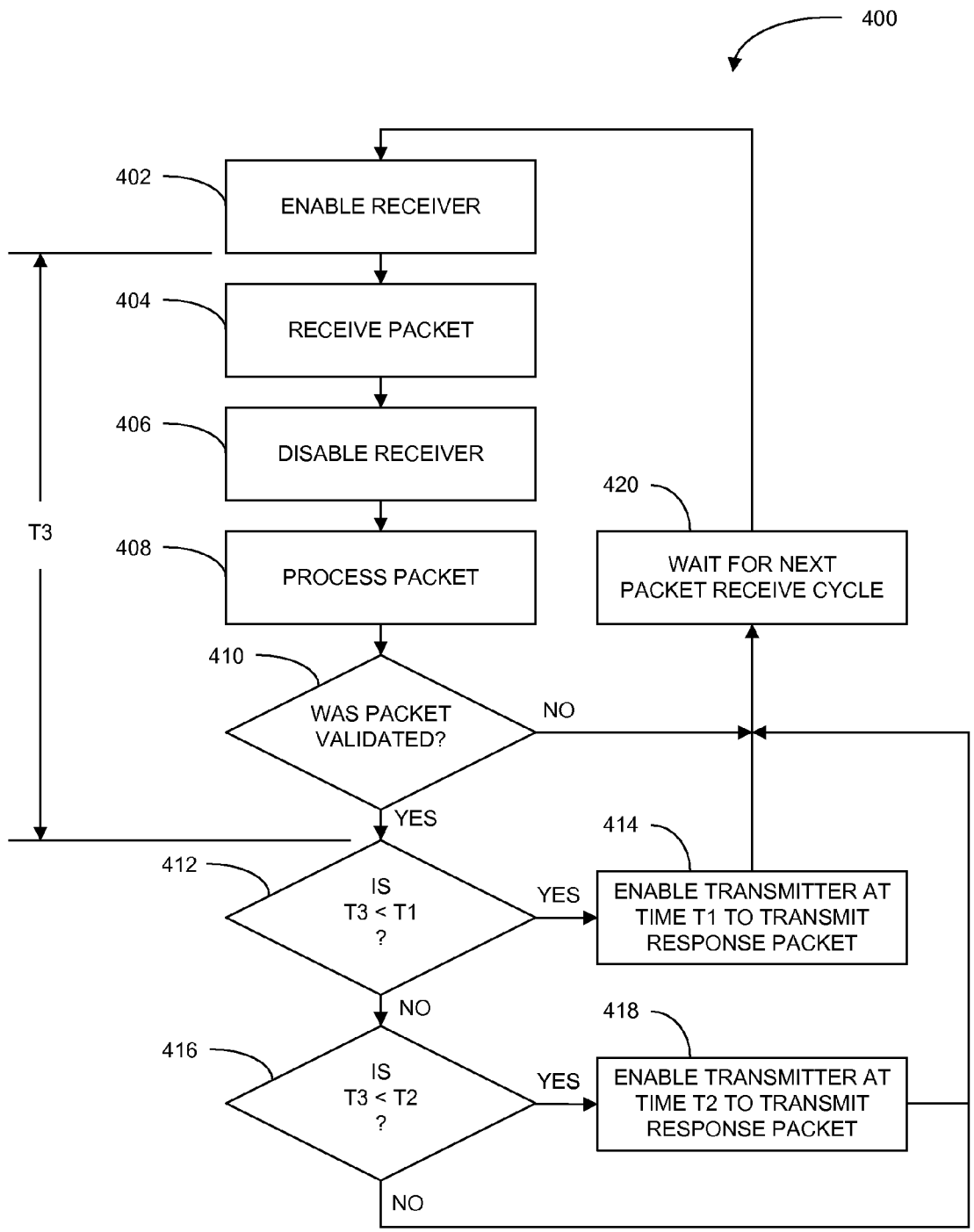
FIG. 4 illustrates a flow diagram of an exemplary method of receiving a packet and transmitting a response packet in accordance with another aspect of the disclosure.

FIG. 4 illustrates a flow diagram of an exemplary method 400 of receiving a packet and transmitting a response packet performed by the destination communications device 104 in accordance with another aspect of the disclosure. According to the method 400, at approximately the beginning of a packet receiving cycle, the destination communications device 104 enables its receiver for the purpose of receiving the data packet from the source communications device 102 (block 402). At such time, the destination communications device 104 initiates a timer to keep track of time T3 from approximately the beginning of the packet receiving cycle. After the receiver is enabled, the destination communications device 104 receives the packet from the source communications device 102 (block 404). After receiving the packet, the destination communications device 104 disables its receiver in order to better conserve power (block 406). The destination communications device 104 then processes the packet in an attempt to validate it (block 408).

The destination communications device 104 then determines whether the received packet was validated (block 410). If, in block 410, it has determined that the received packet was not validated, the destination communications device 104 waits for the next packet receiving cycle (block 420). If, on the other hand, in block 410, it determines that it has validated the received packet, the destination communications device 104 then determines whether time interval T3 is less than the first defined time interval T1 (e.g., T3<T1?) (block 412). If it determines that time interval T3 is less than time interval T1, the destination communications device 104 enables its transmitter at approximately the end of the first defined time interval T1 and transmits a response packet to the source communications device 102 (block 414). After that, the destination communications device 104 waits for the next packet receiving cycle (block 420).

If, on the other hand, in block 412 the destination communications device 104 determines that time interval T3 is greater than time interval T1, the device 104 then determines whether the time interval T3 is less than the second defined time interval T2 (e.g., T3<T2?) (block 416). If, in block 416, it has determined that time interval T3 is less than time interval T2, the destination communications device 104 enables its transmitter at approximately the end of the second defined time interval T2 and transmits a response packet to the source communications device 102 (block 418). After that, the destination communications device 104 waits for the next packet receiving cycle (block 420). If, on the other hand, in block 416 it determines that the time interval T3 is greater than time interval T2, the destination communications device 104 proceeds directly to waiting for the next packet receiving cycle (block 420).

Figure 5:
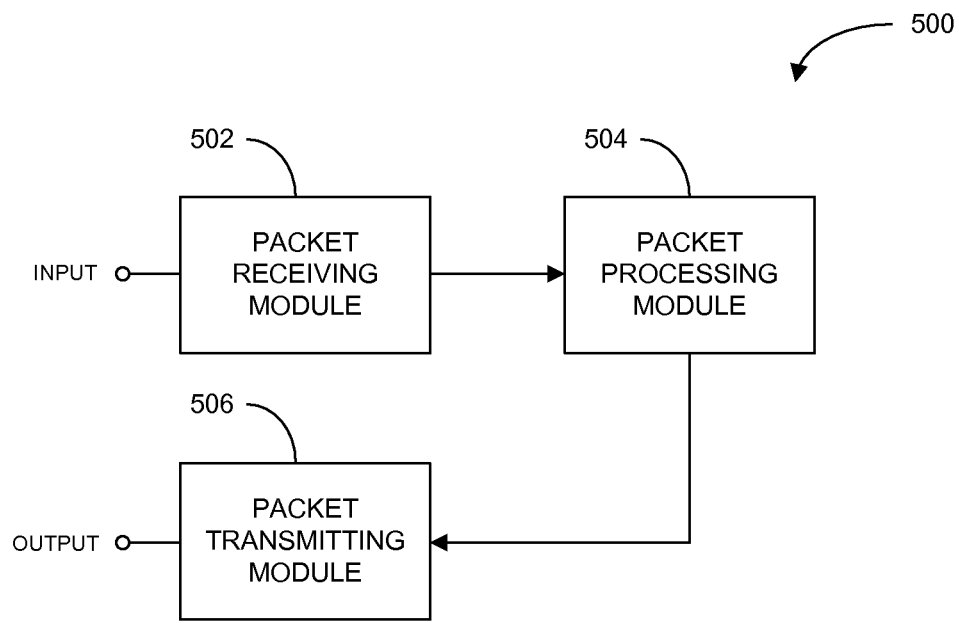
FIG. 5 illustrates a block diagram of an exemplary communications apparatus in accordance with another aspect of the disclosure.

FIG. 5 illustrates a block diagram of an exemplary communications apparatus 500 in accordance with another aspect of the disclosure. The communications apparatus 500 may be one exemplary implementation of a destination communications device previously discussed. The communications apparatus 500 comprises a packet receiving module 502, a packet processing module 504, and a packet transmitting module 506. The packet receiving module 502 is configured to receive a packet from a source communications device. The packet processing module 504 is configured to process the received packet. The packet transmitting module 506 is configured to transmit a response packet to the source communications device approximately at an end of a first defined time interval if the packet processing module 504 completes processing the received packet within the first defined time interval; or transmit the response packet to the source communications device approximately at an end of a second defined time interval if the packet processing module 504 does not complete processing the received packet within the first defined time interval, but completes processing the received packet within the second defined time interval.

Figure 6:
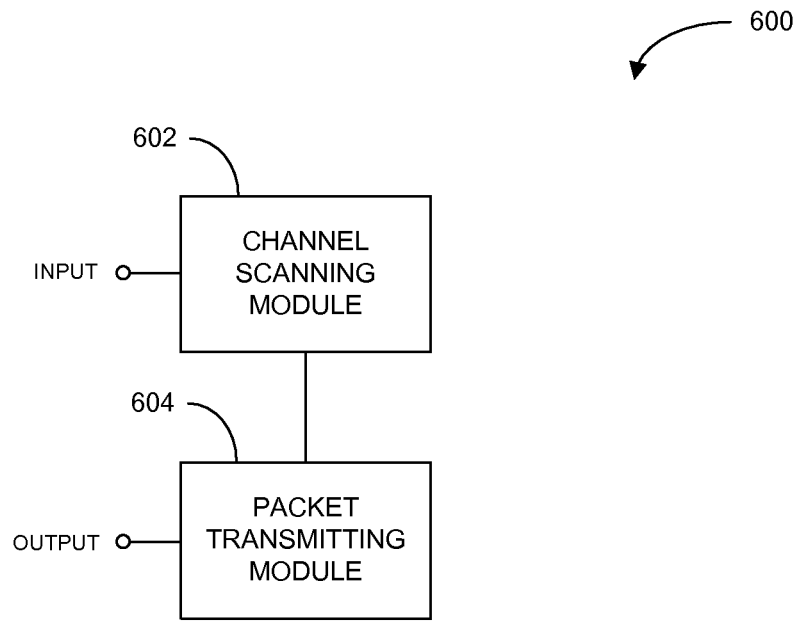
FIG. 6 illustrates a block diagram of another exemplary communications apparatus in accordance with another aspect of the disclosure.

FIG. 6 illustrates a block diagram of another exemplary communications apparatus 600 in accordance with another aspect of the disclosure. The communications apparatus 600 may be one exemplary implementation of a source communications device previously discussed. The communications apparatus 600 comprises a channel scanning module 602 and a packet transmitting module 604. The packet transmitting module 604 is configured to transmit a packet to a destination communications device. The channel scanning module 602 is configured to scan a channel for a response packet from the destination communications device approximately at an end of a first defined interval from the transmission of the packet by the packet transmitting module 604; and scan the channel for the response packet approximately at an end of a second defined time interval from the transmission of the packet by the packet transmitting module 604 if the response packet was not received within the first defined time interval.

Figure 7:
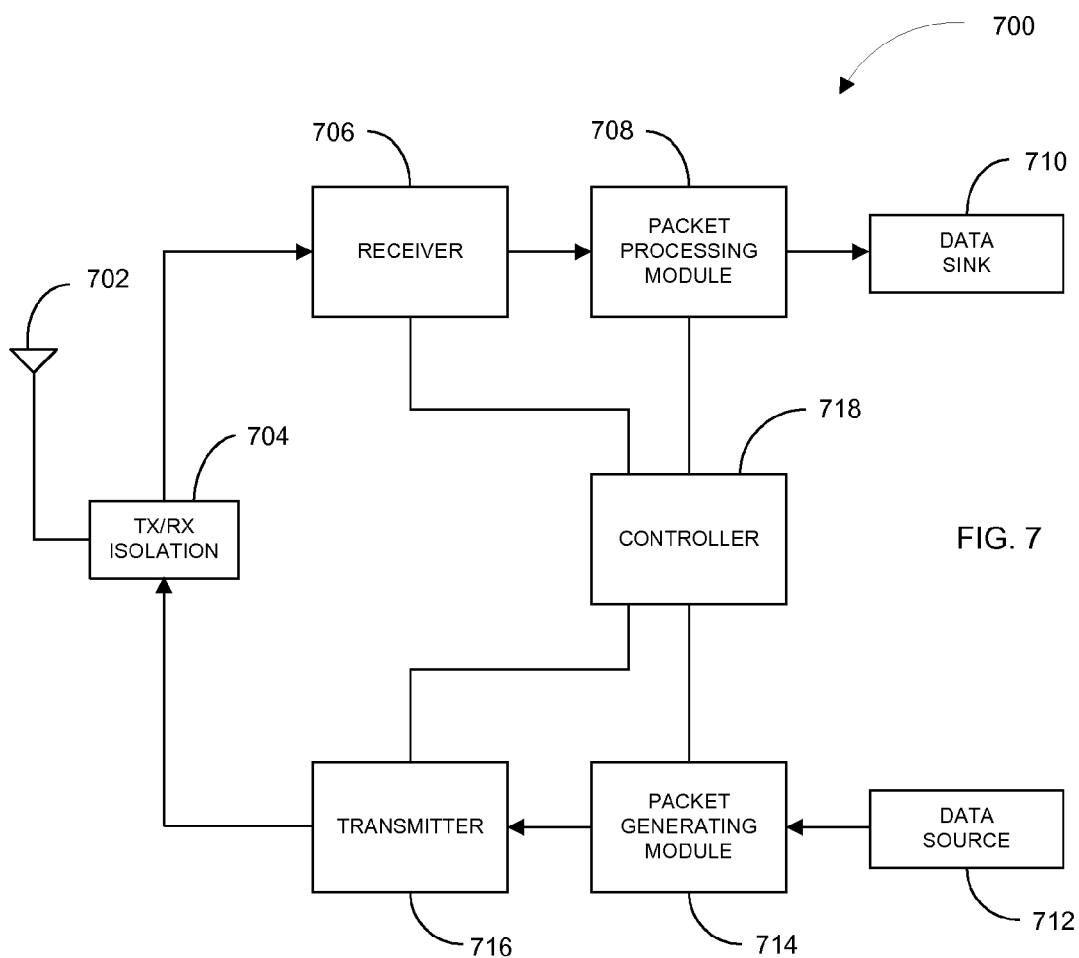
FIG. 7 illustrates a block diagram of yet another exemplary communications apparatus in accordance with another aspect of the disclosure.

FIG. 7 illustrates a block diagram of an exemplary communications device 700 in accordance with another aspect of the disclosure. The communications device 700 may be one exemplary implementation of the source and/or destination communications device previously discussed. In particular, the communications device 700 comprises an antenna 702, a Tx/Rx isolation device 704, a receiver 706, a packet processing module 708, a data sink 710, a data source 712, a packet generating module 714, a transmitter 716, and a controller 718.

In acting as a source communications device, data to be transmitted to a destination communications device is generated at the data source 712 and provided to the packet generating module 714. The packet generating module 714, in turn, forms a data packet incorporating the data for transmission to the destination communications device. The packet generating module 714 provides the data packet to the transmitter 716 which configures the packet for transmission via a wireless medium (e.g., data encodes, interleaves, channel encodes, modulates, up-converts, etc.). The transmitter then sends the configured data packet to the antenna 702 via the Tx/Rx isolation device 704 for propagation into the wireless medium. The data source 712 may be a sensor, a microprocessor, a microcontroller, a RISC processor, a keyboard, a pointing device such as a mouse or a track ball, an audio device, such as a headset, including a transducer such as a microphone, a medical device, a shoe, a robotic or mechanical device that generates data, a user interface, such as a touch-sensitive display, etc.

The controller 718 may enable the transmitter 716 approximately at the beginning of a packet transmitting cycle for the purpose of transmitting the packet. The controller 718 may disable the transmitter 716 in response to the transmitter completing the transmission of the packet. After transmission of the packet, the controller 718 may initiate a timer for the purpose of scanning the channel at one or more possible time intervals from the transmission of the packet. At approximately an end of the first defined time interval T1 from the transmission of the packet, the controller 718 may enable the receiver 706 to perform a first scan S1 of the channel for reception of a response packet from the destination communications device. If a response packet is received during the first scan S1, the controller 718 disables the receiver 706 in order to conserve power. The receiver 706 may perform the necessary function to extract the response packet from a received signal (e.g., filter, amplify, downconvert, channel decode, de-interleave, data decode, etc.). The receiver 706 provides the response packet to the packet processing module 708, which extracts the data from the response packet and provides the data to the data sink 710 for additional use thereof.

If a response packet is not received during the first scan S1, the controller 718 disables the receiver 706 after the first scan S1 is complete in order to conserve power. At approximately an end of a second defined time interval T2 from the transmission of the packet, the controller 718 may enable the receiver 706 again to perform a second scan S2 of the channel for reception of a response packet from the destination communications device. If a response packet is received during the second scan S2, the controller 718 disables the receiver 706 in order to conserve power. The response packet may be processed by the packet processing module 708, and the extracted data from the response packet may be provided to the data sink 710 for additional use thereof.

In acting as a destination communications device, the controller 718 may enable the receiver 706 at approximately the beginning of a packet receiving cycle to receive a packet from a source communications device. In response to receiving the packet from the source communications device, the controller 718 disables the receiver 706 in order to conserve power, and initiates a timer for the purpose of transmitting a response packet to source communications device at approximately an end of one of a first or second defined time interval T1 or T2. The received packet is provided to the packet processing module 708 which process the packet in order to validate it. After validating the packet, the packet processing module 708 sends the extracted data to the data sink for additional use thereof, and informs the controller 718 that the processing of the packet is complete. The data sink 710 may be a microprocessor, a microcontroller, a RISC processor, an audio device, such as a headset, including a transducer such as a speaker, a medical device, a shoe, a robotic or mechanical device that responds to received data, a user interface, such as a display, one or more light emitting diodes (LED), etc.

The controller 718 then determines whether the time that has elapsed from the initiating of the timer is less than a first defined time interval T1. If it is, the controller 718 instructs the packet generating module 714 to generate a response packet, and enables the transmitter 716 at approximately an end of the first defined time interval T1 to transmit the response packet to the source destination device. If, on the other hand, the controller 718 determines that the time elapsed from the initiation of the timer is greater than the first defined time interval T1, but less than the second defined time interval T2, the controller 718 instructs the packet generating module 714 to generate a response packet, and enables the transmitter 716 at approximately an end of the second defined time interval T2 to transmit the response packet to the source destination device.

Figure 8A:
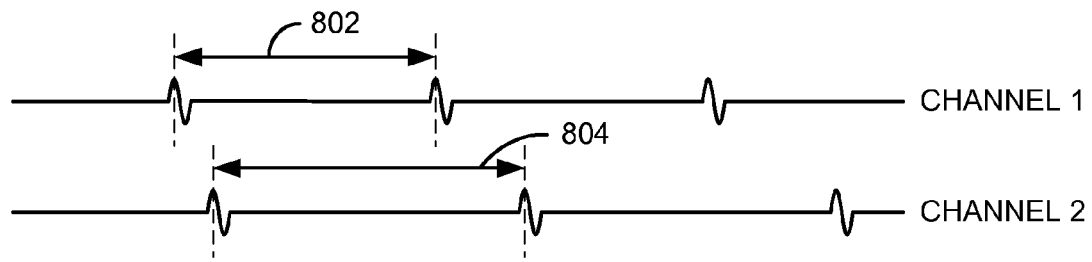
FIGS. 8A-D illustrate timing diagrams of various pulse modulation techniques in accordance with another aspect of the disclosure.

FIG. 8A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 802. Conversely, pulses for channel 2 have a pulse repetition frequency (PRF) corresponding to a pulse-to-pulse delay period 804. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF). Conversely, a channel supporting relatively high data rates (e.g., on the order of a several megabits per second or Mbps) may employ a correspondingly high pulse repetition frequency (PRF).

Figure 8B:
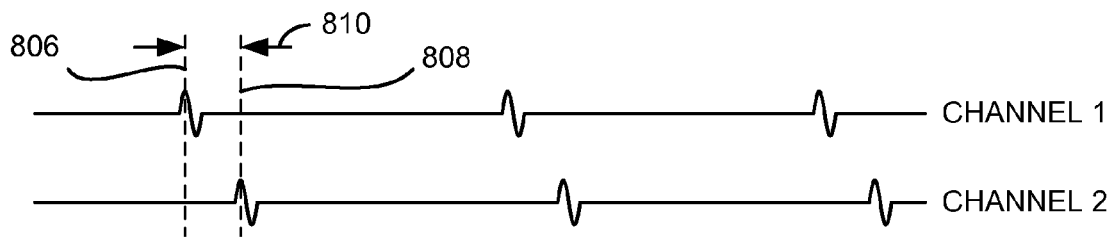

FIG. 8B illustrates different channels (channels 1 and 2) defined with different pulse positions or offsets as an example of a modulation that may be employed in any of the communications systems described herein. Pulses for channel 1 are generated at a point in time as represented by line 806 in accordance with a first pulse offset (e.g., with respect to a given point in time, not shown). Conversely, pulses for channel 2 are generated at a point in time as represented by line 808 in accordance with a second pulse offset. Given the pulse offset difference between the pulses (as represented by the arrows 810), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 8C:
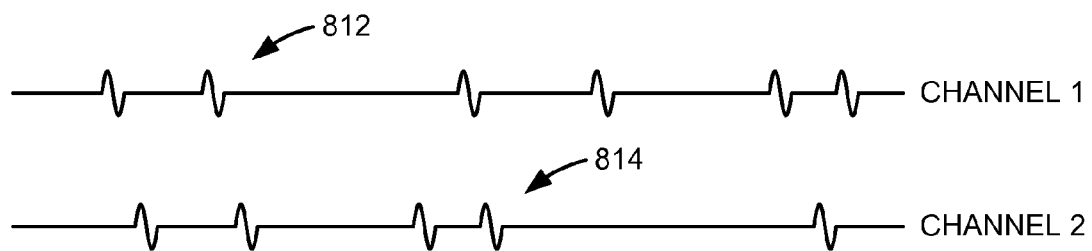

FIG. 8C illustrates different channels (channels 1 and 2) defined with different timing hopping sequences modulation that may be employed in any of the communications systems described herein. For example, pulses 812 for channel 1 may be generated at times in accordance with one time hopping sequence while pulses 814 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 8D:
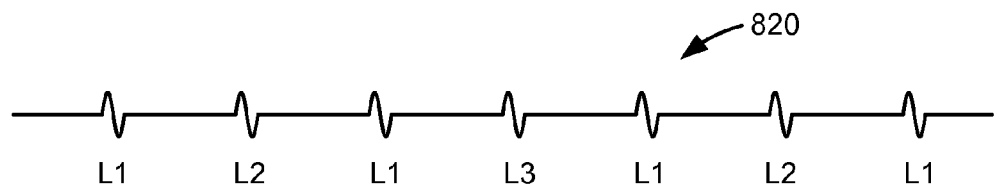

FIG. 8D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 9:
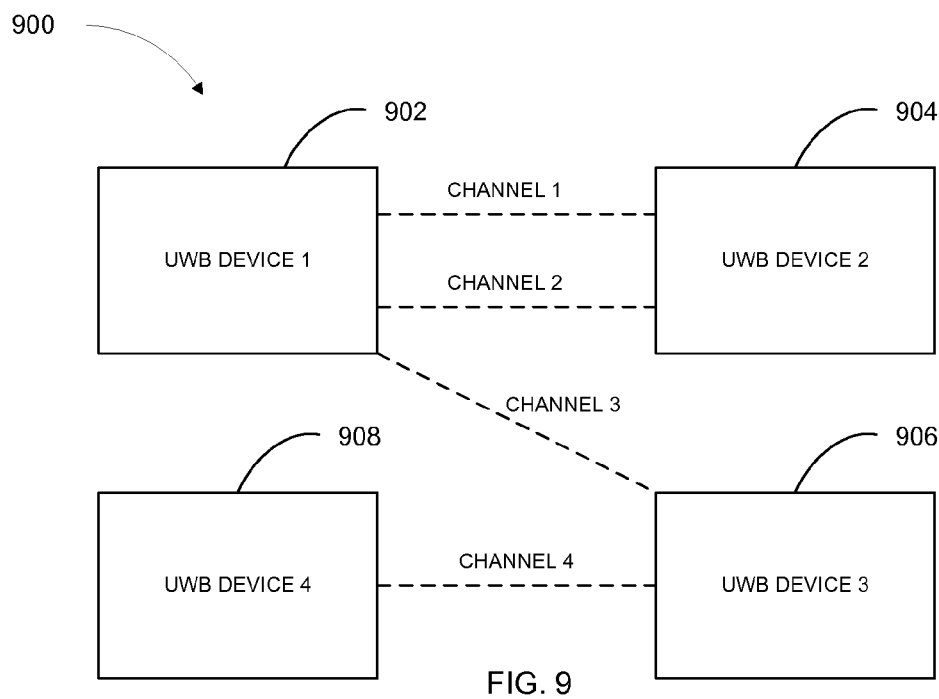
FIG. 9 illustrates a block diagram of various communications devices communicating with each other via various channels in accordance with another aspect of the disclosure.

FIG. 9 illustrates a block diagram of various ultra-wide band (UWB) communications devices communicating with each other via various channels in accordance with another aspect of the disclosure. For example, UWB device 1 902 is communicating with UWB device 2 904 via two concurrent UWB channels 1 and 2. UWB device 902 is communicating with UWB device 3 906 via a single channel 3. And, UWB device 3 906 is, in turn, communicating with UWB device 4 908 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A communication method, comprising:
    receiving a first packet approximately at a start of a first defined time interval or a second defined time interval, wherein the first and second time intervals have distinct first and second defined durations, respectively;
    processing the first packet;
    transmitting a second packet responsive to the first packet before receiving another packet since the reception of the first packet at approximately an end of the first defined time interval if the processing of the first packet is completed within the first defined interval; and
    transmitting the second packet responsive to the first packet before receiving another packet since the reception of the first packet at approximately an end of the second defined time interval if the processing of the first packet is not completed within the first defined interval and is completed within the second defined interval.

2. The method of claim 1, wherein the first defined interval is based on at least one of a first estimated duration for receiving the first packet or a second estimated duration for processing the first packet.

3. The method of claim 1, wherein the first packet comprises at least one of a preamble or a payload.

4. The method of claim 1, wherein the second packet comprises at least one of a preamble or a message indicating at least one of receiving the first packet, processing the first packet, or validating the first packet.

5. The method of claim 1, wherein a difference between the first defined interval and the second defined interval is based on simultaneous communications links being supported.

6. The method of claim 1, further comprising disabling a receiver in response to receiving the first packet.

7. The method of claim 1, further comprising disabling a transmitter in response to transmitting the second packet.

8. A communication apparatus, comprising:
a receiver adapted to receive a first packet approximately at a start of a first defined time interval or a second defined time interval, wherein the first and second time intervals have distinct first and second defined durations, respectively;
a processor adapted to process the first packet; and
a transmitter adapted to:
  transmit a second packet responsive to the first packet before the receiver receives another packet since the reception of the first packet at approximately an end of the first defined time interval if the processing of the first packet is completed within the first defined interval; or
  transmit the second packet responsive to the first packet before the receiver receives another packet since the reception of the first packet at approximately an end of the second defined time interval if the processing of the first packet is not completed within the first defined interval and is completed within the second defined interval.

9. The apparatus of claim 8, wherein the first defined interval is based on at least one of a first estimated duration for receiving the first packet or a second estimated duration for processing the first packet.

10. The apparatus of claim 8, wherein the first packet comprises at least one of a preamble or a payload.

11. The apparatus of claim 8, wherein the second packet comprises at least one of a preamble or a message indicating at least one of receiving the first packet, processing the first packet, or validating the first packet.

12. The apparatus of claim 8, wherein a difference between the first defined interval and the second defined interval is based on simultaneous communications links being supported by at least one of the receiver or transmitter.

13. The apparatus of claim 8, further comprising a controller adapted to disable the receiver in response to the receiver receiving the first packet.

14. The apparatus of claim 8, further comprising a controller adapted to disable the transmitter in response to transmitting the second packet.

15. A communication apparatus, comprising:
means for receiving a first packet approximately at a start of a first defined time interval or a second defined time interval, wherein the first and second time intervals have distinct first and second defined durations, respectively;
means for processing the first packet; and
means for transmitting a second packet responsive to the first packet before the means for receiving receives another packet since the reception of the first packet at approximately an end of:
  the first defined time interval if the processing of the first packet is completed within the first defined interval; or
  the second defined time interval if the processing of the first packet is not completed within the first defined interval and is completed within the second defined interval.

16. The apparatus of claim 15, wherein the first defined interval is based on at least one of a first estimated duration for receiving the first packet or a second estimated duration for processing the first packet.

17. The apparatus of claim 15, wherein the first packet comprises at least one of a preamble or a payload.

18. The apparatus of claim 15, further comprising means for generating the second packet, wherein the second packet generating means is adapted to provide information within the second packet indicating at least one of receiving the first packet, processing the first packet, or validating the first packet.

19. The apparatus of claim 15, wherein a difference between the first defined interval and the second defined interval is based on simultaneous communications links being supported by at least one of the receiving means or transmitting means.

20. The apparatus of claim 15, further comprising means for disabling the receiving means in response to the receiving means receiving the first packet.

21. The apparatus of claim 15, further comprising means for disabling the transmitting means in response to the transmitting means transmitting the second packet.

22. A computer program product for communication comprising:
a non-transitory computer readable medium encoded with instructions executable to:
  receive a first packet approximately at a start of a first defined time interval or a second defined time interval, wherein the first and second time intervals have distinct first and second defined durations, respectively;
  process the first packet; and
  transmit a second packet responsive to the first packet before receiving another packet since the reception of the first packet at approximately an end of:
    the first defined time interval if the processing of the first packet is completed within the first defined interval; or
    the second defined time interval if the processing of the first packet is not completed within the first defined interval and is completed within the second defined interval.

* * * * *